US010754796B2

(12) United States Patent
Tsirkin (10) Patent No.: US 10,754,796 B2
(45) Date of Patent: Aug. 25, 2020

(54) EFFICIENT USER SPACE DRIVER ISOLATION BY CPU PAGE TABLE SWITCHING

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 80 days.

(21) Appl. No.: 16/116,028

(22) Filed: Aug. 29, 2018

(65) Prior Publication Data
US 2020/0073826 A1    Mar. 5, 2020

(51) Int. Cl.
*G06F 13/00*      (2006.01)
*G06F 12/14*      (2006.01)
*G06F 12/1009*    (2016.01)
*G06F 21/53*      (2013.01)
*G06F 9/4401*     (2018.01)
(Continued)

(52) U.S. Cl.
CPC ...... *G06F 12/1458* (2013.01); *G06F 9/30101* (2013.01); *G06F 9/4411* (2013.01); *G06F 9/45558* (2013.01); *G06F 12/1009* (2013.01); *G06F 21/53* (2013.01); *G06F 2009/45579* (2013.01); *G06F 2009/45583* (2013.01); *G06F 2009/45587* (2013.01)

(58) Field of Classification Search
CPC ............. G06F 12/1458; G06F 9/30101; G06F 12/1009
See application file for complete search history.

(56) References Cited

U.S. PATENT DOCUMENTS 5,708,811 A * 1/1998 Arendt ................ G06F 9/44521
717/163
7,673,109 B2    3/2010 Wrighton et al.
8,266,628 B2    9/2012 Chen et al.
(Continued)

OTHER PUBLICATIONS

Li, Wenhao, et al., "Reducing World Switches in Virtualized Environment with Flexible Cross-world Calls", Shanghai Key Laboratory of Scalable Computing and Systems, Shanghai Jiao Tong University, Jun. 2015, 13 pages.
(Continued)

*Primary Examiner* — Sean D Rossiter
(74) *Attorney, Agent, or Firm* — Lowenstein Sandler LLP (57) ABSTRACT

Systems and methods for providing technology that enhances memory protection between different portions of the user space memory of a particular computing process. An example method may comprise: creating a computing process comprising a first executable code and a second executable code; loading the first and second executable code into user space memory of the computing process, wherein the second executable code comprises driver code of a device; updating a first and second page table structures, wherein the first page table structure comprises mapping data for the first and second executable code and wherein the second page table structure comprises mapping data to access the device; providing, by the processor, an instruction enabling the computing process to switch to the second page table structure; and enabling the first executable code to execute using the first page table structure and the second executable code to execute using the second page table structure to access the device.

20 Claims, 5 Drawing Sheets

(51) Int. Cl.
*G06F 9/455* (2018.01)
*G06F 9/30* (2018.01)

(56) References Cited

U.S. PATENT DOCUMENTS

| | | | |
|---|---|---|---|
| 9,424,199 B2 | 8/2016 | Kegel et al. | |
| 9,477,509 B2 * | 10/2016 | Tsirkin | G06F 9/4812 |
| 9,842,065 B2 | 12/2017 | Banginwar et al. | |
| 10,255,088 B2 * | 4/2019 | Tsirkin | G06F 12/1009 |
| 2015/0007318 A1 * | 1/2015 | Van De Ven | G06F 12/1491 726/23 |
| 2016/0014209 A1 * | 1/2016 | Cesena | G06F 16/954 709/203 |
| 2016/0216984 A1 * | 7/2016 | Tsirkin | G06F 9/45558 |
| 2016/0253110 A1 * | 9/2016 | Tsirkin | G06F 12/14 711/162 |
| 2016/0253193 A1 * | 9/2016 | Tsirkin | G06F 9/45558 718/1 |
| 2017/0061509 A1 * | 3/2017 | Rosenberg | H04L 67/306 |
| 2017/0242721 A1 * | 8/2017 | Tsirkin | G06F 9/4812 |
| 2018/0059974 A1 * | 3/2018 | Tsirkin | G06F 21/6218 |
| 2018/0060103 A1 * | 3/2018 | Tsirkin | G06F 9/45558 |
| 2018/0136867 A1 * | 5/2018 | Tsirkin | G06F 9/45545 |
| 2018/0173555 A1 | 6/2018 | Lutas | |
| 2018/0203804 A1 * | 7/2018 | Kraemer | G06F 12/1009 |
| 2020/0073826 A1 * | 3/2020 | Tsirkin | G06F 9/30101 |

OTHER PUBLICATIONS

Sharif, Monirul, et al., Secure In-VM Monitoring Using Hardware Virtualization, Georgia Institute of Technology, Atlanta, GA, USA; Microsoft Research, Redmond, WA, USA; Institute Eurecom, Sophia Antipolis, France, Nov. 2009, 12 pages.

Milewski, Bartosz, Virtual Machines: Virtualizing Virtual Memory, Corensic, Multicore Concurrency Blog, Dec. 5, 2011, 7 pages.

\* cited by examiner

EFFICIENT USER SPACE DRIVER ISOLATION BY CPU PAGE TABLE SWITCHING

TECHNICAL FIELD

The present disclosure is generally related to memory protection in a computing device, and more particularly, to enhancing memory protection between different portions of user space memory of a computing process.

BACKGROUND

Computer systems often include memory management features that provide memory protection. The memory management features may restrict particular processes from accessing particular portions of memory. The restriction may be enforced using a combination of hardware features and kernel features that work together to enable or restrict an executing process from accessing memory resources. The memory resources are often separated into user space and kernel space and when a user space process attempts to access memory resources in kernel space the memory management features may generate a segmentation fault. The segmentation fault may indicate that an access violation occurred so that it can be handled accordingly. Device drivers typically execute in kernel space and rely on the memory management features to protect memory associated with the device driver from being accessed by user space processes.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Modern computer systems have begun implementing device drivers in user space to enhance performance. The enhancement to performance often adversely affects the memory protection features of the computer system. In one example, driver code of the device driver may be loaded into user space memory so that a process can execute the driver code while in user mode without performing a context switch to a more privileged mode. Therefore, the user mode process can interact with a device and avoid the overhead of context switches that occur when executing a system call or hypervisor call. User space drivers may enable application code to circumvent driver code and directly access the device. The access may be malicious or inadvertent and may be due to defective code (e.g., bugs), malicious code, other code, or a combination thereof. Enabling a process to circumvent the driver code to access the device may result in the memory of the device being improperly accessed and may result in the device being corrupted, inoperable, other effect, or a combination thereof.

Aspects of the present disclosure address the above and other deficiencies by providing technology that enhances memory protection between different portions of the user space memory of a particular computing process. The technology may involve the creation and use of two or more page table structures to control which portions of code in user space memory have access to a particular portion of user space memory (e.g., memory mapped device). The page table structures may include mapping data that correlates addresses in user space memory (e.g., virtual addresses) to addresses in physical memory (e.g., physical addresses). Each page table structure may include mapping data that identifies the same physical addresses for the application code and the driver code but a first page table structure may be absent data providing access to the device and a second page table structure may include data to access the device (e.g., memory mapped to device). In addition, the first page table structure may indicate the application code is executable and the second page table structure may indicate the same application code is non-executable. During execution, the user space process may cause a processor to switch from the first page table structure to the second page table structure to enable the driver code to access the device and to restrict application code from executing. Prior to completing its execution, the driver code may switch the page table back to the first page table structure to enable the application code to continue executing.

In one example, the technology involves an enhancement to a processor that enables the processor to support multiple simultaneous page table structures and exposes an instruction to switch between the page table structures. The processor may execute a supervisor process (e.g., kernel or hypervisor) that creates and manages a computing process (e.g., application process or virtual machine). The computing process may execute in user mode and be associated with a portion of user space memory. The processor may load driver code of a device and application code into the user space memory of the computing process. The supervisor may then configure a first page table structure and a second page table structure such that both include mapping data for the application code and driver code. The second page table structure may be further configured to make the application code non-executable and to include access to the device. Providing access to the device may involve configuring a portion of the user space memory to map to memory of the device or to a communication channel for the device. During execution, the computing process may invoke the processor instruction to transition from the first page table structure to the second page table structure. This may enable the computing process to execute the application code while using the first page table structure and the driver code to switch to the second page table structure to access the device. This may enhance the memory isolation and restrict the ability of the application code to circumvent the driver code to access the portion of user space memory mapped to the device.

The systems and methods described herein include technical improvements to memory management features of a computer system. In particular, aspects of the present disclosure may be particularly advantageous for a computer system that is using a user space device driver. The technical improvements enhance the memory protection and provide increased security, stability, and maintenance of a computing device. The security may be enhanced because the technology may enable memory isolation between different portions of a process's user space memory. For example, insecure application code that is loaded in user space memory may now have restricted access to device memory even though the device memory is mapped into a common portion of user space memory. This may enhance device stability because the memory protection may reduce direct access of application code to a device and therefore enforce application code to use driver code to access the device (e.g., use a certified device driver). This may also enhance maintenance because the isolation may make it easier to separate and debug application defects and device driver defects since errors encountered by the device are unlikely to be caused by isolated application code.

Various aspects of the above referenced methods and systems are described in details herein below by way of examples, rather than by way of limitation. The examples provided below discuss the method above applied to restrict application code from directly modifying a memory mapped device. In other examples, the method and system discussed herein may be applied generally to restrict executable code of a computing process from accessing a particular portion of the user space memory of the computing process.

Figure 1:
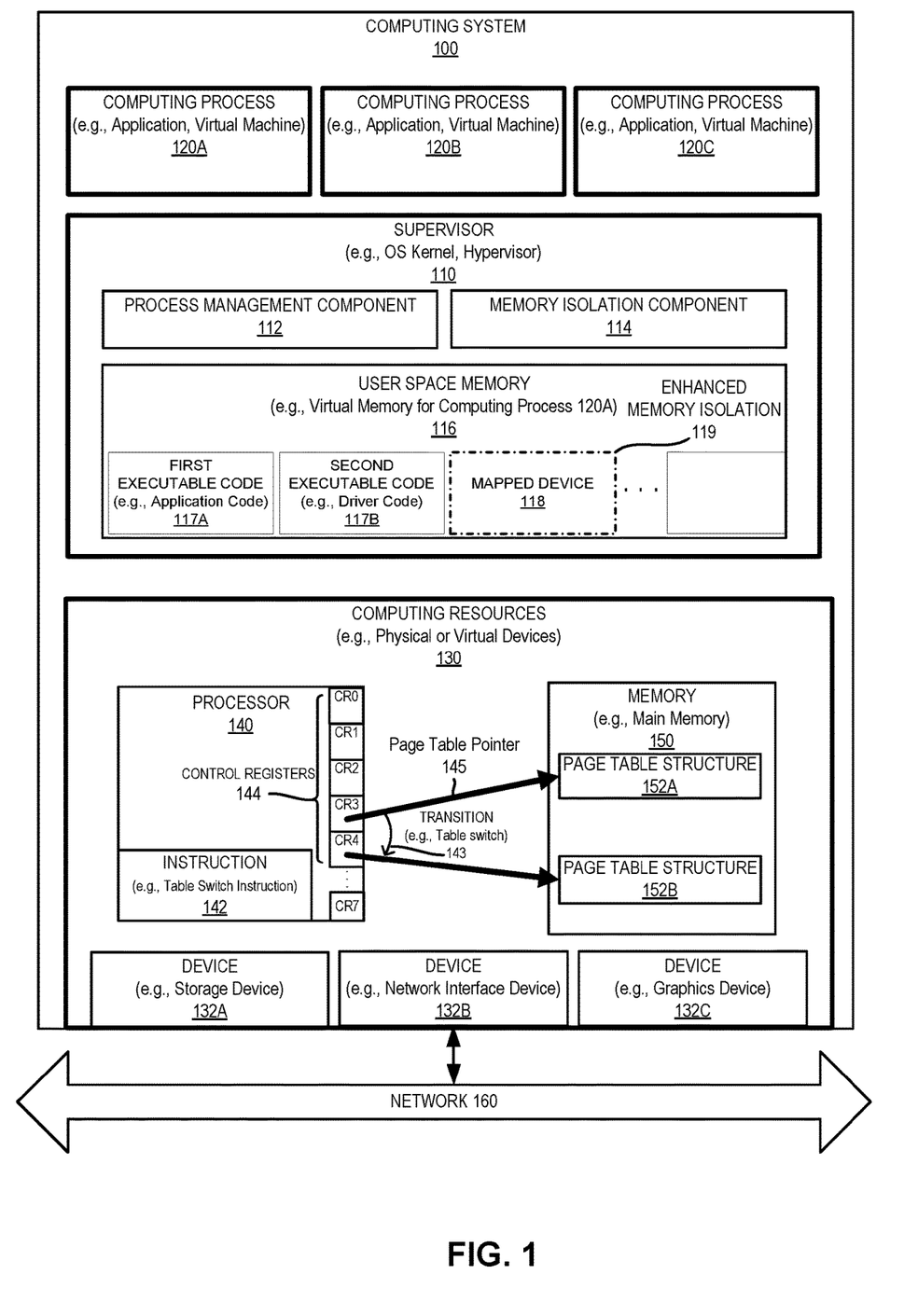
FIG. 1 depicts a high-level block diagram of an example computing system that provides memory protection between different portions of the user space memory assigned to a single computing process, in accordance with one or more aspects of the present disclosure.

FIG. 1 depicts an illustrative architecture of elements of a computing system 100, in accordance with an embodiment of the present disclosure. Computing system 100 may be a single host machine or multiple host machines arranged in a heterogeneous or homogenous group (e.g., cluster) and may include one or more rack mounted servers, workstations, desktop computers, notebook computers, tablet computers, mobile phones, palm-sized computing devices, personal digital assistants (PDAs), etc. It should be noted that other architectures for computing system 100 are possible, and that the implementation of a computing system utilizing embodiments of the disclosure are not necessarily limited to the specific architecture depicted. In one example, computing system 100 may be a computing device implemented with x86 hardware. In another example, computing system 100 may be a computing device implemented with PowerPC®, SPARC®, or other hardware. In the example shown in FIG. 1, computing system 100 may include a supervisor 110, computing processes 120A-C, computing resources 130, and a network 160.

Supervisor 110 may manage the execution of one or more computing processes and provide the computing processes with access to one or more underlying computing devices (e.g., hardware or virtualized resources). Supervisor 110 may be the same or similar to a kernel and may be a part of an operating system, hypervisor, or a combination thereof. Supervisor 110 may interact with computing resources 130 and provide hardware virtualization, operating-system virtualization, other virtualization, or a combination thereof. Hardware virtualization may involve the creation of one or more virtual machines that emulate an instance of a physical computing machine. Operating-system-level virtualization may involve the creation of one or more containers that emulate an instance of an operating system. In one example, supervisor 110 may be part of a non-virtualized operating system that is absent hardware virtualization and operating-system-level virtualization and each of the computing processes 120A-C may be an application process managed by the non-virtualized operating system. In another example, supervisor 110 may be a hypervisor or include hypervisor functionality and each of computing processes 120A-C may execute within a separate virtual machine or container. In either example, the supervisor may be implemented as part of a kernel and execute as one or more processes in kernel space (e.g., privileged mode, kernel mode, root mode).

In the example, shown in FIG. 1, supervisor 110 may include process management component 112 and memory isolation component 114. Process management component 112 may enable supervisor 110 to create and configure computing processes 120A-C. Memory isolation component 114 may enable supervisor 110 to provide memory isolation between different portions of a computing process's user space memory by using multiple page table structures. Process management component 112 and memory isolation component 114 are discussed in more detail in regards to FIG. 2 and may be used individually or in combination to provide enhanced memory management features for computing processes 120A-C.

Computing processes 120A-C may include a sequence of instructions that can be executed by one or more processing devices (e.g., processor 140). A computing process may be managed by supervisor 110 or may be a part of supervisor 110. For example, supervisor 110 may execute as one or more computing processes that cooperate to manage resource accessed by computing processes 120A-C. Each computing process may include one or more threads, processes, other stream of executable instructions, or a combination thereof. A thread may any computer based "thread of execution" and may be the smallest sequence of programmed instructions managed by supervisor 110. A process may include one or more threads and may be an instance of an executable computer program.

Computing processes 120A-C may be associated with a particular level of privilege that may be the same or similar to protection levels (e.g., processor protection rings). The privilege level may indicate an access level of a computing process to computing devices (e.g., memory, processor, or other virtual or physical resources). There may be multiple different privilege levels assigned to the computing processes 120A-C. In one example, the privilege levels may correspond generally to a user mode (e.g., reduced privilege mode, non-root mode, non-privileged mode) and a supervisor mode (e.g., enhanced privilege mode, kernel mode, root mode). The computing process executing in user mode may access resources assigned to the computing processes and may be restricted from accessing resources associated with kernel space or with another user mode process (e.g., other portion of user space). The supervisor mode may enable the computing process to access resources associated with the kernel space and the user space. In other examples, there may be a plurality of privilege levels, and the privilege levels may include a first level (e.g., ring 0) associated with a supervisor/kernel, a second and third level (e.g., ring 1-2), and a fourth level (e.g., ring 3) that may be associated with user space applications.

A computing process may be referred to as a user space process when the computing process is executing with a user mode privilege level. The term user space process and user mode process may be used interchangeably herein. In one example, the privilege level associated with a computing process may change during execution and a computing process executing in user space (e.g., userland) may request and be subsequently granted enhanced privileges by supervisor 110. Modifying the privilege level is often associated with a context switch (e.g., system call or hypercall) and may be associated with a substantial performance penalty. Therefore, it is advantageous if a user space process can avoid a modification of its privilege level and can perform tasks by accessing user space memory 116.

User space memory 116 may be a portion of virtual memory that is assigned to a particular computing process (e.g., 120A). The virtual memory may be managed by supervisor 110 and may be segregated into kernel space (not shown) and user space. The user space may be referred to as userland and may be further segregated into individual portions that are assigned to respective computing processes 120A-C. To simplify the illustration, the portions of the user space assigned to computing process 120A is illustrated (e.g., user space memory 116) and the portions of user space assigned to computing processes 120B and 120C are not shown. During execution of computing process 120A, the user space memory 116 may be updated to add or remove executable data and non-executable data.

The executable data may be referred to as executable code and may include binary code, machine code, object code, bytecode, other code, or a combination thereof. The executable code may be a collection of one or more instructions, function calls, commands, operations, or a combination thereof. The executable code may be loaded into user space memory 116 from one or more storage objects in secondary storage (e.g., hard drive, solid state drive). The storage objects may include one or more file objects (e.g., files, directories), database objects (e.g., records), other storage objects, or a combination. In one example, the storage objects may include one or more executables (EXE), libraries (e.g., dynamically linked library (DLL), shared object library (SO)), other executable objects, or a combination thereof. As shown in FIG. 1, the executable data in user space memory 116 may include first executable code 117A and second executable code 117B.

First executable code 117A and second executable code 117B may correspond to executable data from different computer programs that may or may not interact with one another. The computer programs may be designed, developed, and distributed by different entities or by the same entity. First executable code 117A may depend on functionality provided by the second executable code 117B or may be independent from functionality provided by the second executable code 117B. First executable code 117A may be dependent on second executable code 117B if it invokes features implemented by second executable code 117B. In one example, first executable code 117A may be uncertified application code and the second executable code may be certified driver code. The certification may be based on policies of the provider of the supervisor (e.g., kernel development entity), the provider of the device (e.g., device development entity), a third party source, or a combination thereof. The application code may link directly or indirectly to the second executable code 117B and make calls to the driver code to cause a device to perform computing tasks.

First executable code 117A may be any computer program and may include application code. The term application code may be used synonymously with program code and need not provide a user interface or interact directly or indirectly with a user. Some examples of first executable code 117A may include one or more computer programs implementing network function virtualization (NFV). Network function virtualization may be a virtual network architecture that virtualizes networking features that are provided by traditional physical network nodes. Network function virtualization may provide virtual switches, routers, firewalls, network accelerators, intrusion detection devices, load balancers, other networking device, or a combination thereof.

Second executable code 117B may be any computer program that is associated with one or more of devices 132 (e.g., network interface device 132B). Second executable code 117B may include executable code of a device driver that operates or controls a particular type of device and may be referred to as driver code. The driver code may enable computing processes 120A-C (e.g., applications) or supervisor 110 (e.g., kernel) to access functions of a device without being aware of the underlying details of the device. The device driver may communicate with the device through a computer bus or communication subsystem.

Second executable code 117B may provide features (e.g., routines, functions, methods) that can be invoked by first executable code 117A or supervisor 110. In response to being invoked, second executable code 117B may issue commands to the corresponding device. When the device sends data back to the device driver, the device driver may invoke routines in the original invoking program. Device drivers may be dependent on the supervisor type (e.g., operating-system type), processor type (e.g., hardware architecture), or a combination thereof. In one example, second executable code 117B may be used to implement a user space device driver.

A user space device driver is a device driver that can be executed by a computing process that is running at a user mode privilege level (e.g., a user space process). The driver code for the user space device driver may be loaded into user space memory of the same computing process that is invoking the driver code or into the user space memory of a different computing process. As used herein, the term user space device driver may be used interchangeably with user mode device driver. In one example, the user space device driver may be based on a data plane development kit (DPDK). The data plane development kit may be a framework that includes a set of network interface controller drivers and data plane libraries that support fast packet processing for high speed data packet networking applications. In another example, the user space device driver may be based on a storage performance development kit (SPDK). The storage performance development kit may be a framework that includes a set of storage controller drivers and libraries that support high performance storage applications. SPDK may enable storage drivers to execute in userspace to avoid system calls (e.g., syscalls), hypervisor calls (e.g., hypercalls), or a combination thereof. SPDK may enable zero-copy access from application code. SPDK may also or alternatively enable polling hardware for completions instead of relying on interrupts and avoid (e.g., reduce or eliminate) locks in the I/O path instead relying on message passing.

The user space device driver may communicate with a device by accessing and modifying the mapped device 132 portion of user space memory 116. Mapped device 132 may be mapped to a particular device and be used to implement memory mapped input/output (I/O). Mapped device 132 may be any region of virtual memory that when accessed or modified transmits data to or from the particular device as opposed to or from main memory. In one example, the portion of user space memory for mapped device 132 may correspond to mapped data storage of the particular device (e.g., register, memory, buffer, queue on the device). Therefore, when computing process 120A stores data to mapped device 132 it may be stored in data storage of the device. In another example, the portion of user space memory for mapped device 132 may correspond to a communication channel (e.g., data bus, port, or other interface) that transmits data to the device (e.g., to a processor of the device). In either example, mapped device 132 may enable computing process 120A to communicate with one or more of the devices 132A-C.

Devices 132A-C may be any computing device that can receive a request and perform a computing task. The computing task may involve transmitting data (e.g., output data), receiving data (e.g., input data), or a combination thereof. Devices 132A-C may include physical devices, virtual devices, or a combination thereof. As shown in FIG. 1, device 132A may be a storage device, device 132B may be a network interface device, and device 132C may be a graphics device. The storage device may include a storage controller associated with one or more mass storage devices that include solid-state storage (e.g., Solid State Drives (SSD)), hard drives, other persistent data storage, or a combination thereof. The network interface device may provide access to a network internal to computing system 100 or external to computing system 100 (e.g., network 160) and in one example may be a network interface controller (NIC). The graphics device may provide graphics processing for computing system 100. One or more of devices 132A-C may be combined into one or more physical devices (e.g., integrated devices) or may partially or completely emulated by a combination of computing resources 130. Computing resources 130 may refer to the physical devices, virtual devices, of computing system 100 and may include a processor 140 and memory 150.

Processor 140 may refer to one or more processing devices or processing units that are capable of executing instructions that encode arithmetic, logical, or I/O operations. Processor 140 may be a single core computer processor capable of executing one instruction at a time (e.g., single pipeline of instructions) or may be a multi-core computer processor that simultaneously executes multiple instructions concurrently. A processor may be implemented as a single integrated circuit, two or more integrated circuits, or may be a component of a multi-chip module (e.g., in which individual microprocessor dies are included in a single integrated circuit package and hence share a single socket). Processor 140 may include features of a central processing unit (CPU), graphical processing unit (GPU), a microcontroller, other computer processor, or a combination thereof. Processor 140 may implement an instruction set architecture (ISA) that functions as an interface between processor 140 and the computing processes being executed by processor 140 (e.g., computing processes 120A-C). The instruction set architecture may be the same or similar to x86 (e.g., Intel®, AMD®), PowerPC®, Advanced RISC Machine (ARM®), Scalable Processor Architecture (SPARC®), other computer architecture, or a combination thereof. The instruction set architecture may include an instruction 142.

Instruction 142 may cause the processor to switch the current page table structure. The instruction 142 may be referred to as a processor instruction or a hardware instruction and may cause transition 143 (e.g., page table switch). Instruction 142 may be exposed to code executing at a user mode privilege level (e.g., non-root), a kernel privilege level (e.g., root), other privilege level, or a combination. As a result, instruction 142 may be invoked (e.g., called) by computing processes 120A-C, supervisor 110, or a combination thereof. In one example, instruction 142 may switch between multiple page table structures by updating processor configuration data in one or more control registers 144.

Control registers 144 may be hardware registers that control the behavior of processor 140. Control registers 144 may include internal registers that are on the processor (e.g., processor registers), external register that are external to the processor (e.g., hardware registers), or a combination thereof. Control registers 144 may be set or updated to control processor behavior that is related to interrupts, addressing modes, paging control, other processor functions, or a combination thereof. One or more of the control registers 144 may include a page table pointer 145. In one example, processor 140 may include a single control register (e.g., CR3) that includes a page table pointer. In another example, processor 140 may include multiple control registers (e.g., CR3 and CR7) that each include a page table pointer 145. Page table pointer 145 may include identification data (e.g., physical memory address) of page table structure 152A or 152B.

Page table structures 152A and 152B may be data structures that store mapping data that maps locations within a virtual address space (e.g., virtual memory) to locations in a physical address space (e.g., physical memory). Processor 140 and supervisor 110 may use the page table structure to resolve a virtual memory address to a physical address. In some instances, computing system 100 may support hardware virtualization features that support a guest operating system (OS) and a hypervisor. The guest OS and the hypervisor may each implement memory management features that virtualize the memory resources. As a result, the guest virtual memory and hypervisor virtual memory may overlap and each may have a corresponding page table structure for resolving virtual memory address to physical addresses. For example, a guest OS may use a first layer page table to map a guest virtual memory address to a guest physical memory address and the hypervisor may use a second layer page table to map the hypervisor virtual memory address to the host physical address. To enhance address translation across the multiple layers, the page table structure may be a nested page table (NPT). The nested page table may enable second level address translation by including mapping data that enables a processor to resolve a guest virtual memory address directly to host physical memory addresses. Page table structures 152A-B may each be a nested page tables and may include page table hierarchies comprising one or more page directories and one or more sets of page tables stored in memory 150. In one example, page table structures 152A-B may be the same or similar to Extended Page Tables (EPT) by Intel®, Rapid Virtualization Indexing (RVI) by AMD®, other hardware-assisted virtualization structure, or a combination thereof.

Memory 150 may include any persistent or non-persistent data storage that is capable of storing digital data. Memory 150 may function as main memory for computing system 100 and may include one or more physical memory devices. The physical memory device may be the same or similar to volatile memory devices (e.g., RAM), non-volatile memory devices (e.g., NVRAM), other types of memory devices, or a combination thereof.

Network 160 may be a public network (e.g., the internet), a private network (e.g., a local area network (LAN), wide area network (WAN)), or a combination thereof. In one example, network 160 may include a wired or a wireless infrastructure, which may be provided by one or more wireless communications systems, such as a wireless fidelity (WiFi) hotspot connected with the network 160 and/or a wireless carrier system that can be implemented using various data processing equipment, communication towers, etc.

Figure 2:
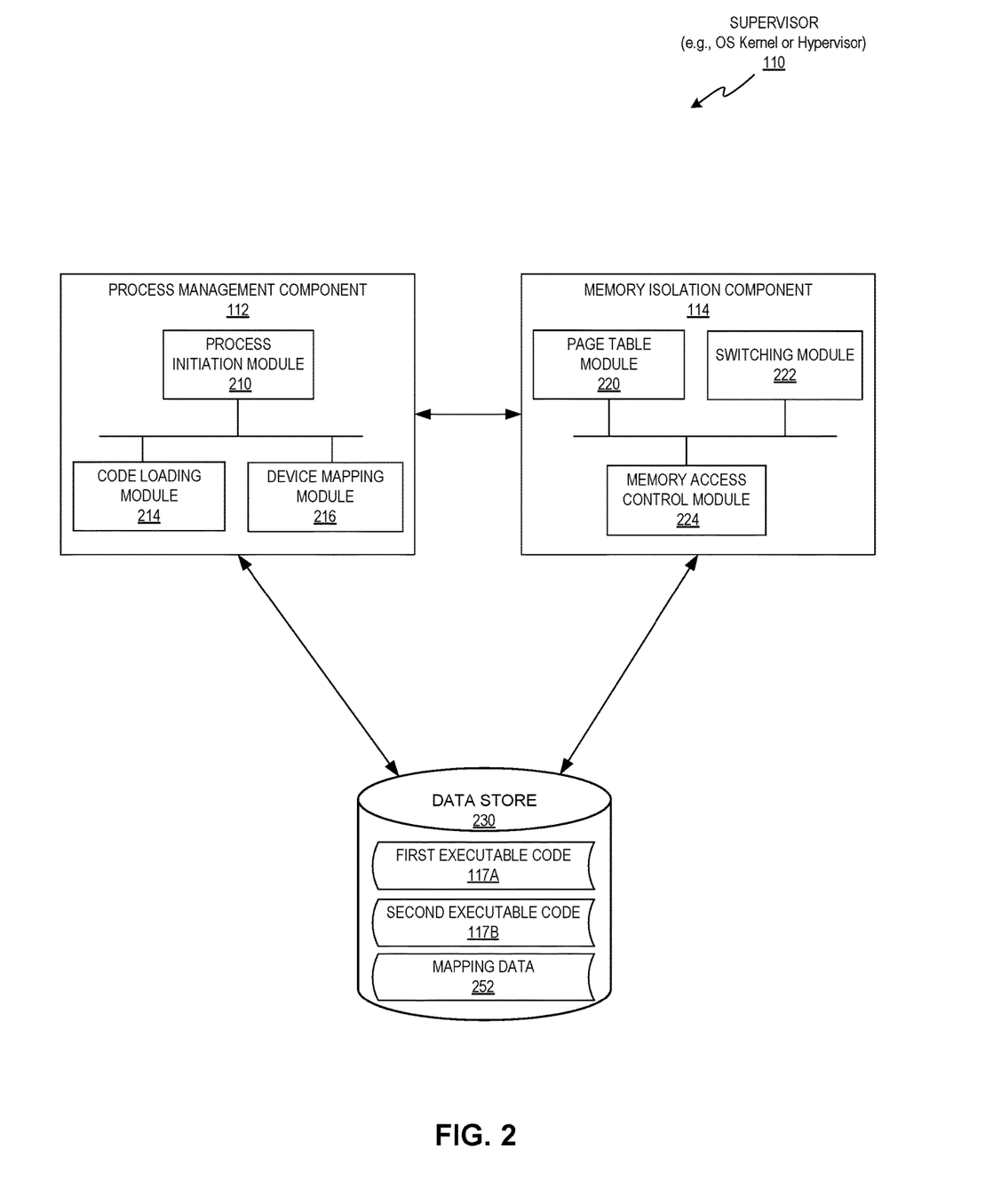
FIG. 2 depicts a block diagram illustrating components and modules of an example supervisor, in accordance with one or more aspects of the present disclosure.

FIG. 2 depicts a block diagram illustrating an exemplary supervisor 110 that includes technology for providing memory isolation between portions of user space memory assigned to a computing process, in accordance with one or more aspects of the present disclosure. Supervisor 110 may be the same or similar to supervisor 110 of FIG. 1 and may include a process management component 112 and a memory isolation component 114, and a data store 230. The components and modules discussed herein may be performed by any portion of supervisor 110 (e.g., kernel/hypervisor) or by an application, virtual machine, other portion of a computing system, or a combination thereof. More or less components or modules may be included without loss of generality. For example, two or more of the components may be combined into a single component, or features of a component may be divided into two or more components. In one implementation, one or more of the components may reside on different computing devices (e.g., a client device and a server device).

Process management component 112 may enable supervisor 110 to manage the execution of one or more computing processes. In one example, process management component 112 may include a process initiation module 210, a code loading module 214, and a device mapping module 216.

Process initiation module 210 may receive and fulfill a request to create a new computing process. In response to the request, process initiation module 210 may initiate, generate, launch, other operation, or a combination thereof to enable the new computing process to be executed by a processor. The request may be based on user input (e.g., user launching an executable) or input from an existing computing process (e.g., spawn, fork or other operation). During process creation, process initiation module 210 may allocate a user space portion of virtual memory and assign it to the new computing process.

Code loading module 214 may enable supervisor 110 to load executable code for the new computing process. Code loading module 214 may load the executable code from secondary storage into physical memory and may associate the executable code with a location (e.g., one or more pages) within user space memory of the computing process. Code loading module 214 may load first executable code 117A and second executable code 117B at the same time or at different times. In one example, first executable code 117A and second executable code 117B may be loaded during an initiation of the new computing process. In another example, first executable code 117A may be loaded when the new computing process is initiated and the second executable code 117B may be loaded after the first executable code 117A begins executing, which may be before, during, or after the first executable code makes a call to second executable code 117B. In either example, first executable code 117A may include application code and second executable code 117B may include driver code and both may be loaded into the same userspace memory of the computing process. The computing process may then execute the first and second executable code to interact with a device via device mapping module 216.

Device mapping module 216 may enable supervisor 110 to configure a portion of the user space memory of the new computing process to access a device (e.g., network controller). In one example, configuring the portion of user space memory may involve mapping virtual memory pages to storage of the device (e.g., register, memory, buffer, queue on the device). In another example, configuring the portion of user space memory may involve mapping virtual memory pages to a communication channel with access to the device. The communication channel may be a local computer bus for attached hardware devices and may be the same or similar to a Peripheral Component Interconnect (PCI) bus. In either example, data accessed via the mapped device (e.g., read from or written to) may involve communication with the device as opposed to main memory.

Memory isolation component 114 may enable supervisor 110 to manage access to the portion of user space memory mapped to a device. Memory isolation component 114 may enable or restrict executable code stored within the user space memory from accessing the portion of the user space memory mapped to the device. In one example, memory isolation component 114 may include a page table module 220, a switching module 222, and a memory access control module 224.

Page table module 220 may enable supervisor 110 to configure multiple page table structures. The page table module 220 may generate the page table structures or update existing page table structures. Updating the page tables may involve adding, removing, or replacing mapping data 252. Mapping data 252 may include permission data, location data, other data or a combination thereof. The permission data may indicate the permissions associated with particular locations in virtual memory and whether the data at the locations is executable, non-executable, privileged, non-privileged, or a combination thereof. The location data may identify one or more locations in virtual memory (e.g., virtual memory addresses) and one or more locations in physical memory (e.g., guest physical memory addresses or host physical memory addresses). In one example, the location data may include one-to-one mapping between a location in virtual memory and a location to physical memory. In another example, the location data may include many-to-one mapping and multiple locations in virtual memory may map to the same location in physical memory. In either example, the multiple page table structures may each be a nested page table structure comprising a mapping between a guest virtual memory addresses and host physical memory addresses.

Page table module 220 may create multiple page table structures that are associated with the same computing process during the execution of the computing process. A first page table structure may be configured to include mapping data for the first executable code and the second executable code but may be absent a mapping to access the device. A second page table structure may include mapping data for the first and second executable code and mapping data to access the device. The second page table may also be configured so that the mapping data indicates the first executable code (e.g., application code) is non-executable.

Switching module 222 may enable a computing process managed by supervisor 110 to invoke an instruction to switch the page table structures used to resolve the computing processes user space virtual memory to physical memory. The instruction may cause the processor to switch from using the first page table structure to using the second page table structure. The instruction may cause an update to the virtual machine data structure and to one or more control registers. In one example, the instruction may update the configuration of the processor and cause the processor to replace a page table pointer in a particular control register (e.g., CR3). In another example, the instruction may update the configuration of the processor to cause the processor to use a different control register to identify the page table structure (e.g., CR7 instead of CR3). In either example, the switch instruction may be a processor instruction that enables the computing process executing in user mode to cause the processor to switch from the first page table structure to the second page table structure.

In one example, the switching instruction may be specific to an Intel® x86 architecture. The x86 architecture may provide hardware assisted virtualization features, which may be referred to as virtual machine Extensions® (VMX). The virtual machine extensions may be activated and controlled using a virtual machine data structure that is referred to as a Virtual Machine Control Structure (VMCS). The instruction may be a specific virtual machine (VM) function (VMFUNC(0)) that switches a page table pointer (e.g., Extended Page Table Pointer (EPTP)) from the first page table structure to the second page table structure (e.g., second extended page table). The VM function is a privileged processor operation that can be invoked by a virtual machine without performing a VM exit and may therefore avoid one or more context switches associated with the VM exit. VM functions may be enabled and configured by the settings of certain fields in the virtual machine data structure. The computing process may invoke the VM function by using a special ISA-dependent instruction (e.g., VMFUNC) in combination with a certain processor register (e.g., EAX) to select the specific aspect of the VM function to be invoked. Even though the VM function code does not run with elevated privileges, it may be granted access to some privileged resources, e.g., the kernel memory or memory of other computing processes.

Memory access control module 224 may enable supervisor 110 to use the features discussed above to restrict or enable access to a device from different portions of executable code. Both the first executable code 117A and second executable code may be executed by the same computing process and stored in the user space memory of the computing process. But memory access control module 224 may restrict the first executable code (e.g., application code) from accessing the portion of user space memory mapped to the device and enable the second executable code (e.g., driver code) to access the portion of user space memory mapped to the device.

The computing system may be configured to restrict access of the first executable code independent of which page table structure is in use. When the first page table structure is in use, the portion of user space mapped to the device may be inaccessible. In one example, the portion of user space mapped to the device may be visible in user space but a lack of mapping data in the first page table may cause the processor to produce an exception when accessed by the first executable code (e.g., error, protection fault, segmentation fault). In another example, missing mapping information may make it appear to the first executable code that there is no portion of user space mapped to the device. Even if the first executable code switches to the second page table structure, the first executable code would still not be able to access the device because the first executable code would have become non-executable. Therefore, the execution of the next instruction of the first executable code would cause a processor exception (e.g., non-executable exception or other error).

The second executable code may access the device by calling the switch instruction. The switch instruction may cause the processor to switch from the first page table structure that is absent the mapping data for the device to the second page table structure that includes mapping data for the device. After the switch, the second executable code may access the portion of user space memory that is mapped to the device and when complete the second executable code may call the same instruction with the same or different parameters to switch back to the first page table structure. Switching back may then enable the first executable code to continue executing.

Figure 3:
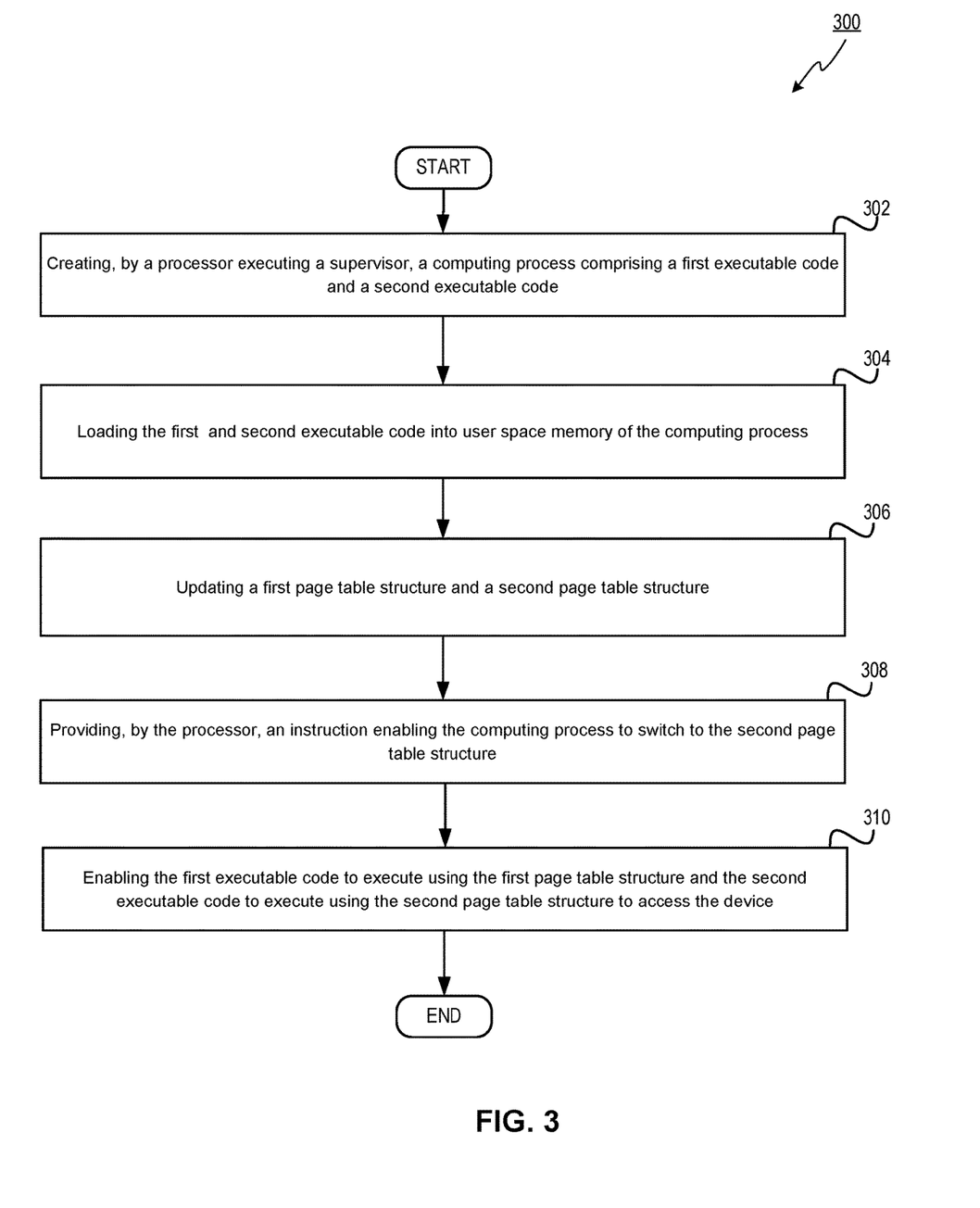
FIG. 3 depicts a flow diagram of an example method for enabling a processor to provide enhanced memory protection for memory resources, in accordance with one or more aspects of the present disclosure.

FIG. 3 depicts a flow diagram of an illustrative example of a method 300 for enabling a processor to provide enhanced memory protection for memory resources, in accordance with one or more aspects of the present disclosure. Method 300 and each of its individual functions, routines, subroutines, or operations may be performed by one or more processors of a computer device executing the method. In certain implementations, method 300 may be performed by a single processor. Alternatively, methods 300 may be performed by two or more processors executing on the computer system and each processor may execute one or more individual functions, routines, subroutines, or operations of the method. In an illustrative example, the processes implementing methods 300 may be synchronized (e.g., using critical sections, semaphores, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing systems (e.g., one or more computing devices). The term "article of manufacture," as used herein, is intended to encompass a computer program accessible from any computer-readable device or storage media. In one implementation, method 300 may be performed by processor 140 executing the supervisor 110 of FIGS. 1 and 2 and may begin at block 302.

At block 302, the processor executing a supervisor may create a computing process comprising a first executable code and a second executable code. The supervisor may be a kernel portion of an operating system that manages an application comprising the computing process or may be a hypervisor managing a virtual machine comprising the computing process. The processor may include at least one processing core that is associated with a first register and a second register. The first and second registers may concurrently (e.g., simultaneously) include page table pointers to different page table structures. The first register may include a page table pointer to the first page table structure and the second register may include a page table pointer to the second page table structure.

At block 304, the processor may load the first executable code and the second executable code into user space memory of the computing process. The first executable code may be application code and the second executable code may be driver code of a device. Both the driver code and the application code may be executed in user mode (e.g., reduced privilege level), as opposed to kernel mode (e.g., enhanced privilege level). In one example, the application code may be unable to access data in memory of the device but may include a call to the driver code to indirectly access data in memory of the device.

At block 306, the processor may update the first page table structure and the second page table structure. Both the first and second page table structures may include mapping data for the first executable code and the second executable code. However, the first page table structure may be absent mapping data to access the device and the second page table may include mapping data to access the device. In addition, the first page table structure may indicate the first executable code can be executed (e.g., associated with executable permissions) and the second page table structure may indicate the first executable code is prohibited from being executed (e.g., associated with non-executable permissions).

At block 308, the processor may provide an instruction enabling the computing process to switch to the second page table structure. The instruction comprises a processor instruction that enables the computing process executing in user mode to cause the processor to switch from the first page table structure to the second page table structure. The instruction may be invoked by the driver code stored in user space memory and may switch to the second page table in order to access the device and may invoke the instruction again to switch to the first page table and restrict access to the device. In one example, the instruction updates configuration data of the processor that indicates a control register that identifies a current page table structure.

At block 310, the processor may enable the first executable code to execute using the first page table structure and the second executable code to execute using the second page table structure to access the device. In addition, the processor may restrict the application code from accessing memory of the device when the application code and the device are mapped into the user space memory of the computing process. Responsive to completing the operations described herein above with references to block 310, the method may terminate.

Figure 4:
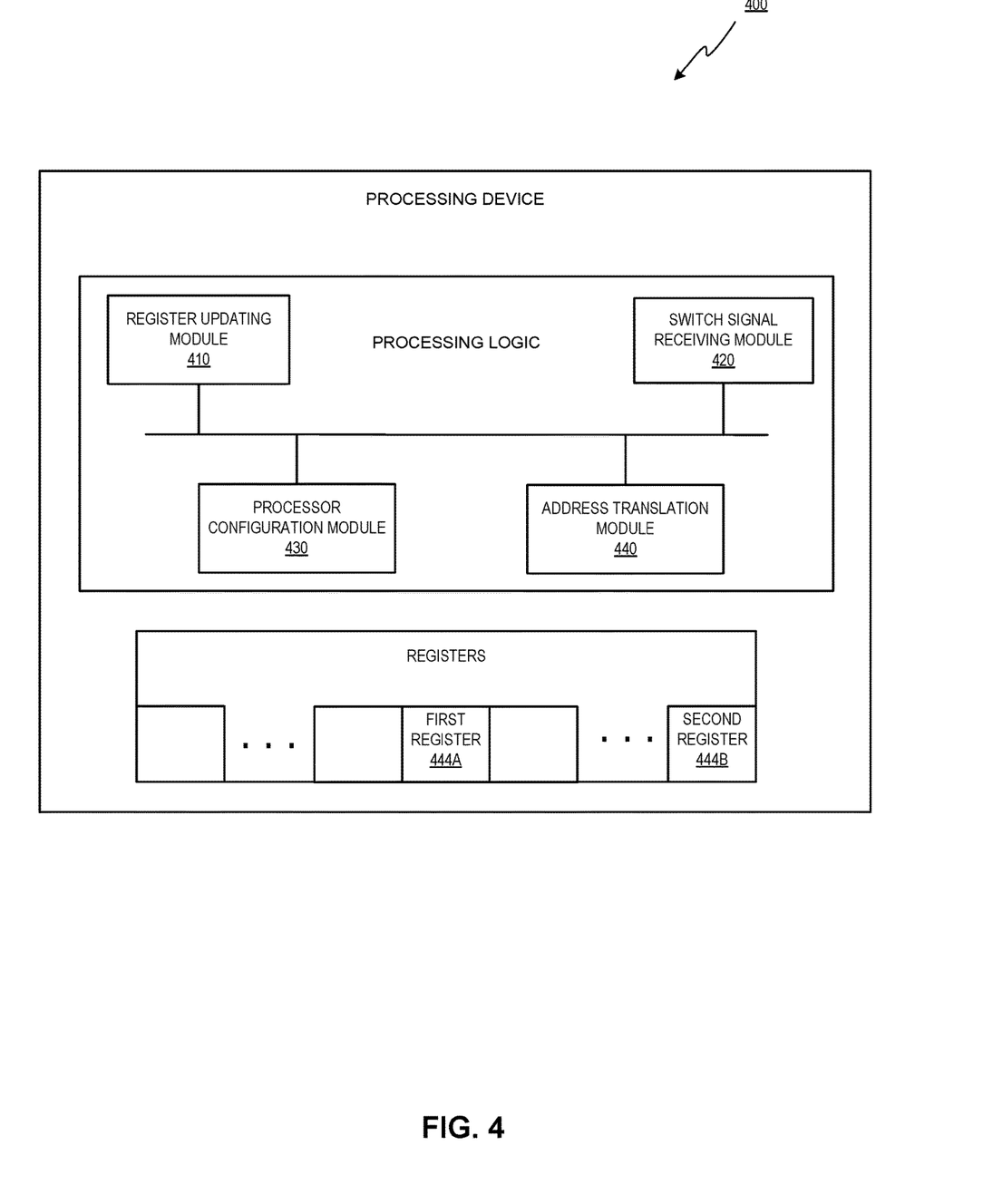
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computing system 100 of FIG. 1 and may include one or more processing devices and one or more memory devices. In the example shown, computer system 400 may include a register updating module 410, a switch signal receiving module 420, processor configuration module 430, and an address translation module 440.

Register updating module 410 may enable a processing device to update one or more registers of the processing device. The plurality of registers may be control registers and may concurrently store page table pointers to different page table structures in use by a particular computing processes that is being executed. In one example, the first register 444A may be a processors control register three (CR3) and the second register 444B may be an alternate register (e.g., CR7 or CR3A). Register updating module 410 may update first register 444A to include a page table pointer to a first page table structure and update second register 444B to include a page table pointer to a second page table structure. A third register may include configuration data that includes a first binary value to indicate a selection of the first register and a second binary value to indicate a selection of the second register.

Switch signal receiving module 420 may enable the processing device to receive a signal. The signal may be initiated when the processing device executes a user mode computing process that invokes (e.g., makes a call to) a processor instruction to perform the page table switch. There may be one or more signals and a second signal may be used to perform an additional the page table switch.

Processor configuration module 430 may enable the processing device to select which page table structure is in use. This may be in response to one of the signals discussed above. Processor configuration module 430 enables the processing device to modify the configuration data of the processing device to select and use a different register to identify the appropriate page table structure.

Address translation module 440 may enable the processing device to translate a virtual memory address to a physical memory address using the appropriate page table structure. The translation may involve a multiple layer address translation (e.g., second level address translation).

Figure 5:
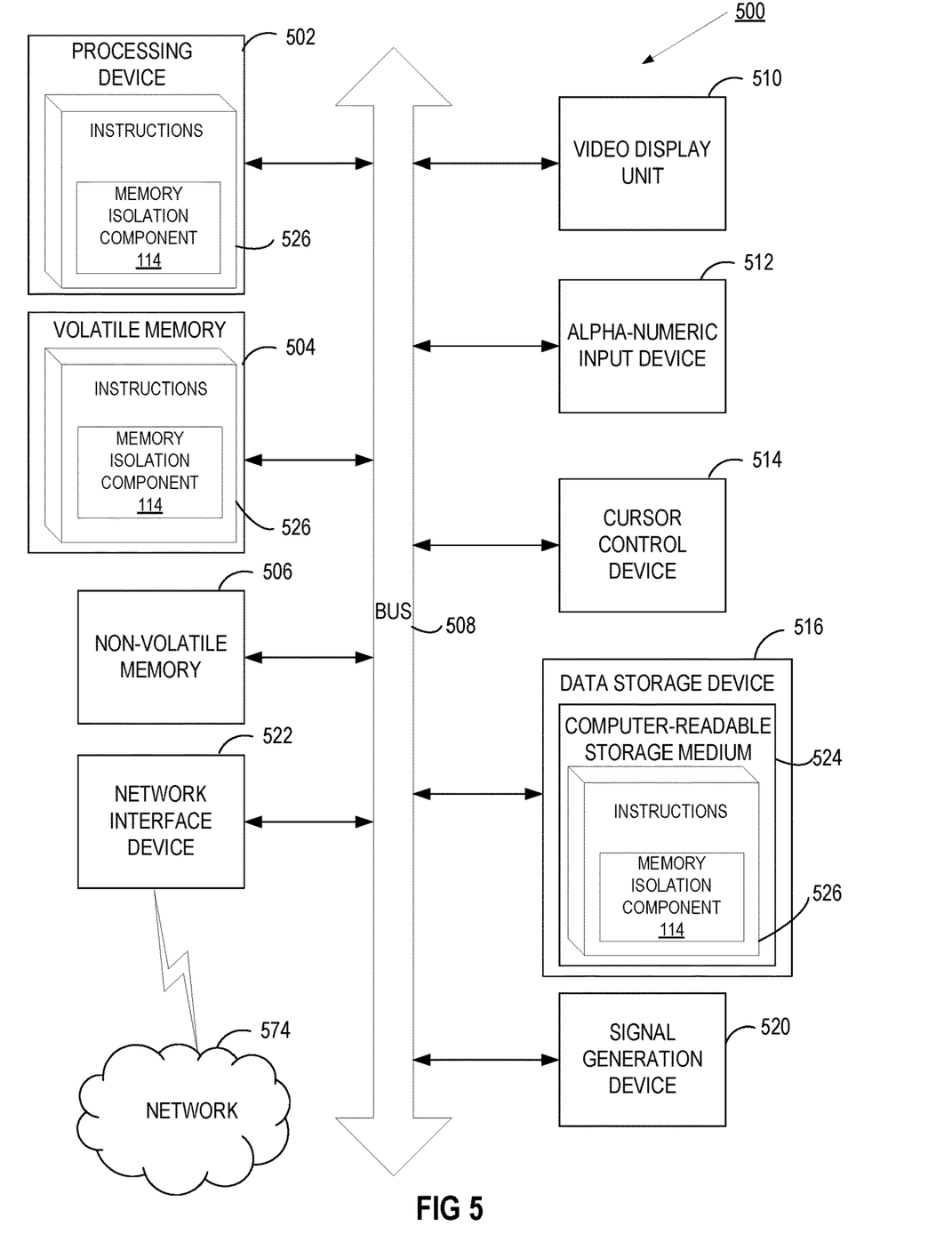
FIG. 5 depicts a block diagram of an illustrative computing device operating in accordance with the examples of the present disclosure.

FIG. 5 depicts a block diagram of a computer system operating in accordance with one or more aspects of the present disclosure. In various illustrative examples, computer system 500 may correspond to computing system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing method 300 and for memory isolation component 114 of FIGS. 1 and 2.

Instructions 526 may also reside, completely or partially, within volatile memory 504 and/or within processing device 502 during execution thereof by computer system 500, hence, volatile memory 504, and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer and cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware resources. Further, the methods, components, and features may be implemented in any combination of hardware resources and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. In addition, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   creating, by a processor executing a supervisor, a computing process comprising a first executable code and a second executable code;
   loading the first executable code and the second executable code into user space memory of the computing process, wherein the second executable code comprises driver code of a device;
   updating a first page table structure and a second page table structure, wherein the first page table structure comprises mapping data for the first executable code and for the second executable code and wherein the second page table structure comprises mapping data to access the device;
   providing, by the processor, an instruction enabling the computing process to switch to the second page table structure; and
   enabling the first executable code to execute using the first page table structure and the second executable code to execute using the second page table structure to access the device.

2. The method of claim 1, wherein the first executable code comprises application code and wherein the second executable code comprises driver code being executed in user mode.

3. The method of claim 2, further comprising enabling the application code to make a call to the driver code to access data in memory of the device.

4. The method of claim 2, further comprising restricting the application code from accessing memory of the device.

5. The method of claim 1, wherein the instruction comprises a processor instruction that enables the computing process executing in user mode to cause the processor to switch from the first page table structure to the second page table structure.

6. The method of claim 1, further comprising generating the first page table structure and the second page table structure, wherein the first page table structure indicates the first executable code can be executed and wherein the second page table structure indicates the first executable code is prohibited from being executed.

7. The method of claim 1, wherein the first page table structure is absent mapping data to access memory of the device and the second page table structure comprises mapping data to access the memory of the device.

8. The method of claim 1, wherein the driver code in the user space memory comprises a first call to the instruction to switch to the second page table structure to access the device and comprises a second call to the instruction to switch to the first page table structure to restrict access to the device.

9. The method of claim 1, wherein the processor comprises at least one processing core associated with a first register and a second register, wherein the first register comprises a page table pointer to the first page table structure and the second register comprises a page table pointer to the second page table structure.

10. The method of claim 1, wherein the instruction updates configuration data of the processor to indicate which register identifies a current page table structure.

11. The method of claim 1, wherein the supervisor is a kernel managing an application comprising the computing process or is a hypervisor managing a virtual machine comprising the computing process.

12. A processing device comprising:
a plurality of registers comprising a first register and a second register;
one or more cores, operatively coupled to the plurality of registers; and
a circuit, operatively coupled to the one or more cores, to:
update the first register to comprise identification data of a first page table structure;
update the second register to comprise identification data of a second page table structure;
receive a signal to perform a page table switch;
modify configuration data of the processing device to select the second register; and
translate a virtual memory address to a physical memory address using the second page table structure.

13. The processing device of claim 12, further comprising a third register comprising the configuration data, wherein the configuration data comprises a first binary value to indicate a selection of the first register and a second binary value to indicate a selection of the second register.

14. The processing device of claim 12, wherein to receive the signal comprises the processing device executing a user mode computing process that invokes a processor instruction to perform the page table switch.

15. The processing device of claim 12, further comprising:
receive a second signal to perform the page table switch; and
modify the configuration data of the processing device to select the first register.

16. The processing device of claim 12, wherein the plurality of registers are a plurality of control registers and wherein the first register comprises control register three (CR3).

17. The processing device of claim 16, wherein the plurality of control registers concurrently store page table pointers to different page table structures in use by a particular computing process.

18. A non-transitory machine-readable storage medium storing instructions that cause a processor to:
create a computing process comprising a first executable code and a second executable code;
load the first executable code and the second executable code into user space memory of the computing process, wherein the second executable code comprises driver code of a device;
update a first page table structure and a second page table structure, wherein the first page table structure comprises mapping data for the first executable code and for the second executable code and wherein the second page table structure comprises mapping data to access the device;
provide an instruction enabling the computing process to switch to the second page table structure; and
enable the first executable code to execute using the first page table structure and the second executable code to execute using the second page table structure to access the device.

19. The non-transitory machine-readable storage medium of claim 18, wherein the first executable code comprises application code and wherein the second executable code comprises driver code being executed in user mode.

20. The non-transitory machine-readable storage medium of claim 19, wherein the application code comprises a call to the driver code to access data in memory of the device.

* * * * *